C. A. MUNSON.
METALLIC PACKING.
APPLICATION FILED OCT. 30, 1912.
1,059,683.
Patented Apr. 22, 1913.
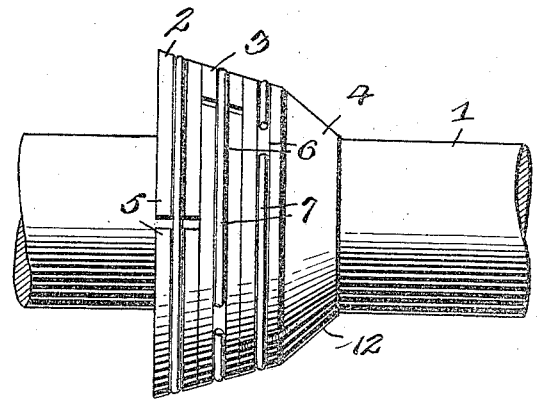
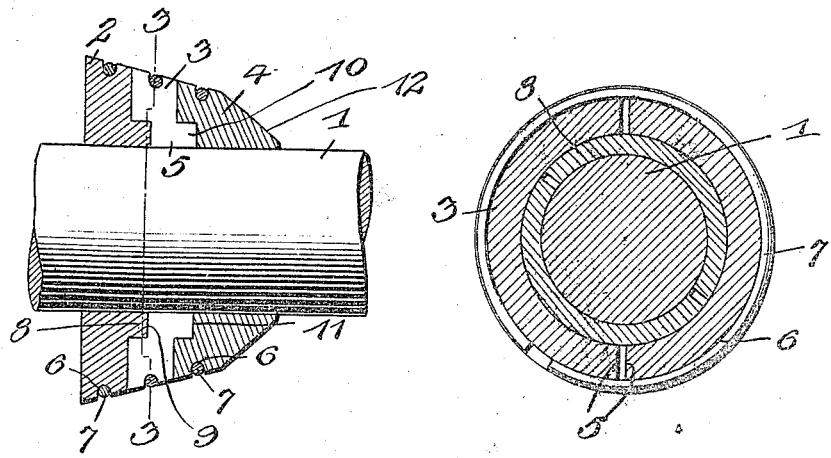
Witnesses
Chas. L. Griesbauer.
A. S. Hind.
Inventor
C. A. Munson
By Watson E. Coleman
Attorney

UNITED STATES PATENT OFFICE.

CHARLES ALBERT MUNSON, OF WILLIAMSON, WEST VIRGINIA, ASSIGNOR OF ONE-HALF TO LUKE C. MOODY, OF NORFOLK, VIRGINIA.

METALLIC PACKING.

1,059,685.

Specification of Letters Patent.   Patented Apr. 22, 1913.

Application filed October 30, 1912.  Serial No. 723,637.

*To all whom it may concern:*

Be it known that I, CHARLES A. MUNSON, a citizen of the United States, residing at Williamson, in the county of Mingo and State of West Virginia, have invented certain new and useful Improvements in Metallic Packing, of which the following is a specification, reference being had to the accompanying drawings.

This invention relates to improvements in metallic packing, and an object thereof is the provision of a packing which is capable of adjustment to compensate for the wear of the parts.

A further object of this invention is the provision of a packing comprising a series of rings which are adapted to encircle the piston rod of a locomotive, the rings being formed in semicircular sections, and the diameter of the inner periphery of the rings being relatively of less degree than the diameter of the piston rod, whereby the rings are capable of adjustment to compensate for the wear of the parts.

A further object of the invention is the provision of a packing which consists of a series of rings which are adapted to encircle the piston rod, the several rings being telescoped upon one another whereby tight joints between the several rings are provided.

With these and other objects in view, my invention resides in the novel features of construction and arrangement of parts to be hereinafter more fully described, claimed and illustrated in the accompanying drawings in which, Figure 1 is a side elevation of the packing mounted on the piston rod. Fig. 2 is a longitudinal section thereof, and Fig. 3 is a section taken on the line 3—3 of Fig. 2.

Referring more particularly to the drawing, the numeral 1 designates the piston rod of a locomotive or other machine, and the numerals 2, 3 and 4 indicate a series of inclosing rings. Each of the rings is formed of two semicircular sections 5 and the outer periphery of each of the rims is formed with a groove 6 for the reception of annular spring members 7 whereby the sections are held in frictional engagement with the piston rod. The outer ring 2 is formed on its inner periphery with a laterally extending rib 8 which is adapted to engage with an annular recess 9 in the ring 3. The ring 3 is also formed with a laterally projecting annular rib 10 which is adapted to rest within the annular groove 11 formed in the inner ring 4 of the packing. It will be seen that from this construction, the rings telescope upon one another whereby tight joints between the respective rings are provided.

The inner ring 4 of the packing is preferably relatively longer than the other rings of the device, and the ring is beveled on one end as at 12 whereby the ring may be frictionally engaged with the valve box (not shown) of the piston rod.

The operation of my device is as follows:—In the practical use thereof, the rings are placed on the end of the piston rod, and moved upwardly on the rod until the inner ring 4 frictionally engages the valve box of the piston rod. It will be seen that when the rings are placed upon the piston rod, the opposing faces of the semicircular sections of the rings are spaced apart and the annular spring member 7 in the groove 6 in the rings, will only hold said rings in close contact with the piston rod. It will be seen that any wear on the inner periphery of the rings, will be compensated for by reason of the pressure of the spring members 7 upon the sections of the ring.

While I have illustrated three rings as constituting my packing, it will be understood that any desired number of rings may be used and that I do not limit myself in this regard.

The rings are preferably constructed of metal of a soft composition, so that the rings may readily conform to any lateral disalinement of the piston rod. It will be seen from the drawing that the spaced opposing edges of the several sections are out of alinement with each other so as to prevent an opening through the packing through which steam and water from the valve casing might escape.

From the above description taken in connection with the accompanying drawing, it will be seen that I have provided a packing which is simple in construction, which may be cheaply manufactured and which will fulfil all the requirements of such a device.

Having thus described my invention, what I desire to claim and secure by Letters Patent is:—

The combination with a piston rod, of a plurality of rings, each of said rings being formed of a plurality of segmental sections constituting in combination a general cone-shaped packing, spring band engaging the said sections for normally forcing said sections inwardly toward each other, the adjacent sides of the rings being disposed in a plane perpendicular to the axis thereof, annular ribs formed upon the rings, the peripheries of said ribs being disposed in planes parallel with the axis of the piston rod and the ends of the ribs being disposed in planes perpendicular to the axis of the piston rod, and corresponding sockets formed in certain of the rings for receiving said ribs.

In testimony whereof I hereunto affix my signature in the presence of two witnesses.

CHARLES ALBERT MUNSON.

Witnesses:
  CLYDE SPAULDING,
  CHARLIE PEAK.